United States Patent [19]

Sokol

[11] Patent Number: 4,836,482
[45] Date of Patent: Jun. 6, 1989

[54] HINGED SUPPORT BRACKET FOR A RADAR DETECTOR OR LIKE DEVICE

[75] Inventor: Steven Sokol, Southfield, Mich.

[73] Assignee: Detroit Bracket Company, Inc., Ferndale, Mich.

[21] Appl. No.: 253,331

[22] Filed: Sep. 2, 1988

Related U.S. Application Data

[63] Continuation of Ser. No. 895,124, Aug. 11, 1986, abandoned.

[51] Int. Cl.4 .............................................. B60R 11/02
[52] U.S. Cl. ................................ 248/206.3; 248/291; 248/309.1
[58] Field of Search ...................... 248/201, 205.2, 208, 248/205.5, 206.2, 206.3, 206.4, 291, 309.1, 312, 312.1, 316.8, 324

[56] References Cited

U.S. PATENT DOCUMENTS

| | | | |
|---|---|---|---|
| 1,167,891 | 1/1916 | Eisenhart | 248/291 |
| 1,483,640 | 2/1924 | Manning | 248/291 |
| 1,600,461 | 9/1926 | Ensign | 248/291 |
| 1,840,763 | 1/1932 | Benchley | 248/206.3 |
| 1,861,041 | 5/1932 | Zaiger | 248/206.3 |
| 2,980,379 | 4/1961 | Goldfus | 248/312 |
| 3,224,594 | 12/1965 | Schweitzer | 248/312 |
| 3,321,068 | 5/1967 | Beach | 248/205.2 |
| 3,521,225 | 7/1970 | Kursman | 248/291 |
| 3,714,619 | 1/1973 | Morgan | 248/291 |
| 3,964,612 | 6/1976 | Skilliter | 248/309.1 |
| 4,065,087 | 12/1977 | Solden | 248/316.8 |
| 4,540,146 | 9/1985 | Basile | 248/201 |

FOREIGN PATENT DOCUMENTS

| | | | |
|---|---|---|---|
| 1408677 | 7/1965 | France | 248/201 |
| 2080095 | 2/1982 | United Kingdom | 248/208 |

Primary Examiner—J. Franklin Foss
Assistant Examiner—Robert A. Olson
Attorney, Agent, or Firm—Fleit, Jacobson, Cohn & Price

[57] ABSTRACT

A hinged support bracket for a radar detector includes a support portion and a mounting portion fixed together by an adjustable hinge. The support portion is generally "T" shaped and contains suction cups at its extremities to hold the bracket to the winshield of a vehicle. The mounting portion includes a planar base and sides extending perpendicularly. The sides contain rails which engage corresponding grooves on a radar detector or an adapter. The hinge is adjusted and fixed in a position whereby, with the support portion attached to the windshield, the mounting portion is essentially horizontal.

12 Claims, 1 Drawing Sheet

HINGED SUPPORT BRACKET FOR A RADAR DETECTOR OR LIKE DEVICE

This application is a continuation of application Ser. No. 895,124, filed Aug. 11, 1986, now abandoned.

BACKGROUND OF THE INVENTION

I. Field of the Invention

The present invention relates to brackets for mounting electronic devices, such as radar detectors, to an interior surface of a motor vehicle and, in particular, to a bracket having a lockable hinge connecting a mounting portion which removably attaches to a windshield, and a support portion for carrying a radar detector or like device.

II. Description of the Prior Art

With the advent of sophisticated, and often expensive, electronic equipment for motor vehicles, means for securely protecting such equipment have become increasingly popular. Since thieves have never been successfully thwarted by equipment which is built into the dashboard of a motor vehicle, the only method of absolutely presenting the unauthorized removal of the equipment is to remove it oneself upon leaving the vehicle. To this end has grown a field of dismountable support brackets for electronic devices.

To further complicate matters, many radar detecting devices must be placed in a position which is unobstructed by the dashboard or the front portion of a vehicle in order to work properly. Although the simplest means for storing electronic equipment is simply to place it on the floor or, in the case of a radar detector, on the dashboard, any sudden stop or turn will cause the device to slide and possibly fall, thereby potentially causing damage to its internal components or the electrical connections. Moreover, since many of these devices have metal housings, such movement may scratch the interior of the vehicle.

In order to provide a more secure mounting of these devices, various brackets have been developed which permit release of the device as necessary. Generally, these brackets are mounted to the underside or other portion of the dashboard, thereby fixedly securing the bracket to the vehicle interior while the device itself is removable. But upon discovering even the empty bracket, a thief is alerted to the fact that the vehicle owner is in possession of some type of electronic equipment, and may look in other parts of the vehicle to locate the device. Moreover, because these brackets are mounted to the dashboard, damage may be caused to the dashboard during installation or prolonged use.

The in-dash or below-dash mounted brackets are also of little use for radar detectors which require an unobstructed detection area. Also, in compact and subcompact vehicles which have little or no leg room, in-dash or below-dash mounting brackets may be impossible. Thus, above dashboard mounting of the electronic device is necessary in many cases, especially with radar detectors.

Particularly with respect to radar detector mounting brackets, some above dash brackets have been previously known. These have included brackets with clips for attachment of the bracket to the vehicle visor. Although this provides an unobstructed detection area, it also causes the visor to sag and makes it inoperable for blocking the sun.

These and other disadvantages are overcome by the bracket of the present invention.

SUMMARY OF THE PRESENT INVENTION

The present invention overcomes previously known disadvantages by providing an improved bracket for supporting a radar detector or like device within a motor vehicle.

The bracket according to the present invention comprises a substantially planar support portion which is pivotably attached to a mounting portion along a common, hinged edge. The two portions may be aligned in a wide variety of angular relationships with respect to one another, and may be selectively locked in any particular desired angular relationship. Secured to the mounting portion of the bracket are a plurality of suction cups which are spaced apart from one another. The suction cups are adapted to firmly, yet detachably, secure the mounting portion to the interior of the windshield of a motor vehicle.

In the preferred embodiment, the support portion of the bracket includes side members which extend perpendicularly from the planar support portion and frictionally engage the radar detector or like device. Alternatively the side members may engage an adapter which supports the device by adhesive or hook and pile strips. The support portion is pivotably connected to the mounting portion by means of a hinge. The hinge includes a locking mechanism which enables the user to lock the support portion to the mounting portion in a desired angular relationship. In the preferred embodiment, a bolt advantageously serves as a hinge pin and a locking mechanism which clamps the two portions in a fixed angular relationship.

In use, the bracket is securely attached to the windshield in a location providing an unobstructed detection area, and the angle of the support portion is adjusted so as to be substantially horizontal. The radar detector or like device is then mounted to the support portion. On termination of use, the radar detector or like device may be removed from the support portion by sliding it out of frictional engagement with the sides. Alternatively, to discourage the potential for theft caused by display of the empty bracket, both the device and the bracket may be removed simultaneously by detaching the suction cups from the windshield.

Other objects, features and advantages of the invention will become apparent from the following detailed description taken in connection with the accompanying drawing.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the several views, and in which.

FIG. a perspective of a preferred embodiment of the present invention; and

Figure 2:
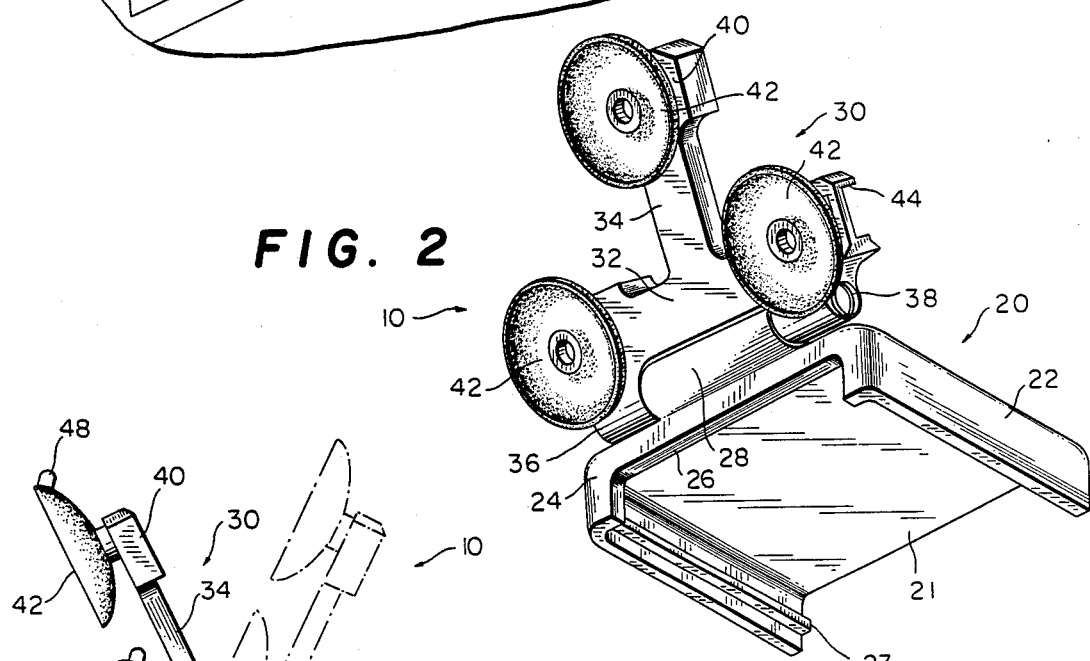
Figure 3:
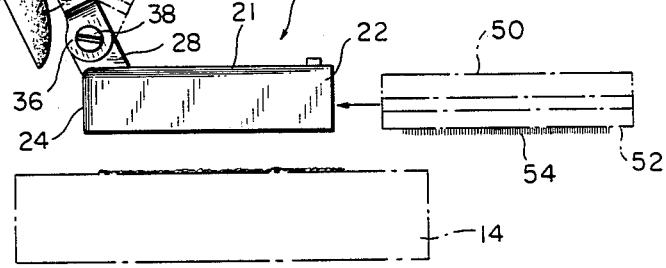

FIG. 3 a side view of the preferred embodiment of FIG. 2, shown with an adapter for use with some devices.

DETAILED DESCRIPTION OF THE PREFERRED EMBODIMENT OF THE PRESENT INVENTION

Figure 1:
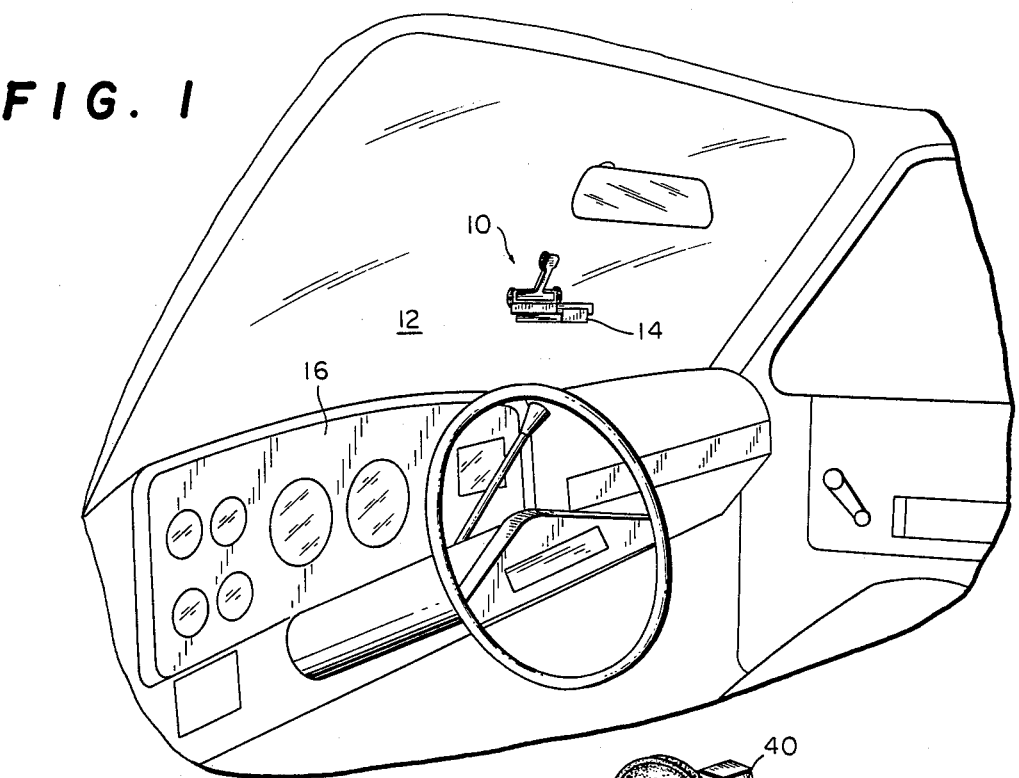
FIG. 1 is a plan perspective of the preferred embodiment mount to the windshield of a motor vehicle.

Referring first to FIG. 1, a bracket 10 is thereshown mounted to the inside of windshield 12 of a motor vehicle. The bracket 10 is mounted in a location free of dashboard 16, and is adjusted so that radar detector or like device 14 assumes a substantially horizontal position with an unobstructed detection area. Although the ensuing description of the preferred embodiment refers specifically to radar detectors, it should be understood that the present invention includes mounting brackets adapted for stereo components, CB radios or similar electronic equipment.

Referring now to FIGS. 2 and 3, the bracket 10 of the present invention is there shown to include a substantially planar support portion 20 and a substantially planar mounting portion 30. Although the mounting portion of the preferred embodiment is configured as a "T", other configurations are also within the scope of the present invention.

The support portion 20 comprises a flat base 21 which is generally rectangular in shape. Sides 22 extend perpendicularly from the base 21 on opposing parallel edges. Preferably, the sides 22 are integral with the base 21 and are simply curved extensions thereof. In addition, the sides 22 contain on their interior surfaces engagement rails 23 for enhanced gripping of certain models of radar detector 14.

Other models of radar detectors as well as other electronic equipment, are not designed specifically to mate with the rails 23 and the sides 22. Such devices (not shown) can be used with the bracket 10 of the present invention by employing an adapter 50 (see FIG. 3). The adapter 50 is generally box shaped and is laterally dimensioned to fit between the sides 22 and to engage the rails 23 of support portion 20. A flat surface 52 includes adhesive or hook and pile strips 54 which adhere to corresponding strips on the other electronic devices. The adapter 50 may be any length or height as required, and preferably is made of a lightweight material. It may also be hollow to further reduce weight.

Also extending from an edge of base 21 is front 24. The front 24 may be integral with the base 21 and sides 22 as in the preferred embodiment shown in FIG. 2. In order for the detecting electronics (not shown) of radar detector 14 to function properly, a cutout 26 is formed in the front 24. Integral with the front 24 and the base 21 is a cylindrical extension 28 having a longitudinal, axial throughbore (not shown). The extension 28 and its throughbore will be more fully described hereinafter.

As best shown in FIG. 2, mounting plate 30 of the preferred embodiment has a substantially "T" shaped configuration. This configuration eliminates unnecessary weight by cutting out non-functional portions of the mounting bracket. The "T" configuration includes a cross bar 32 and a stem 34. Attached at both ends of the top of the cross bar 32 are cylindrical flanges 36. The cylindrical flanges 36 include axial longitudinal throughbores and advantageously are dimensioned to cooperate with the cylindrical extension 28 to form a hinge. A bolt 38 extends through the axial throughbores of flanges 36 and extension 28 and serves as a hinge pin about which support portion 20 and mounting portion 30 pivot. In the preferred embodiment, one of the cylindrical flanges 36 contains an internal thread disposed in its axial throughbore. The free end of bolt 38 is correspondingly threaded so that the bolt 8 can be tightened to clamp the flanges 36 against the extension 28, thereby to lock support portion 20 and mounting portion 30 in a specific, desired angular relationship. Thus, although other means of hinging and locking the two portions of bracket 10 are within the scope of the present invention, in the preferred embodiment the bolt 38 serves as both a pivoting adjustment and a locking mechanism.

As particularly shown in FIG. 2, the outwardly extending ends of the cross bar 32 and the stem 34 contain enlarged portions 40 to which are mounted suction cups 42. The enlarged portions 40 and, thus, the suction cups 42 are spaced apart as far as possible one from the other in the preferred embodiment. This arrangement provides the most stable attachment to the windshield 12. The enlarged portions 40 also provide additional strength for stress placed on the mounting portion 30 at these points. The underside of enlarged portions 40 advantageously may be hollowed out as indicated at 44 to further reduce weight and to receive a screw or other fastening means 46 for attaching the suction cups 42. In this way the fastening means 46 is countersunk within mounting portion 30.

Use of the present invention provides for simple mounting or removal of the radar detector 14 from the windshield 12 of a motor vehicle. The bracket 10 is first secured to the windshield 12 by pressing the mounting portion 30 against the windshield 12 to force out substantially all the air between the suction cups 42 and the windshield 12 to create a vacuum. Once the bracket 10 is secured to the windshield 12 and laterally adjusted, the bolt 38 is loosened to permit angular adjustment of support portion 20. When support portion 20 is adjusted to be substantially horizontal, the bolt 38 is again tightened to lock the portions in the desired angular relationship. Once the desired angle is preset, further adjustment is unlikely necessary unless the bracket 10 is moved to a different vehicle having a windshield 12 of a different slope. When mounting and adjusting of the bracket 10 are completed, the radar detector 14 is slid into the support portion 20, and is secured by mounting means such as frictional engagement with the rails 23.

When using radar detectors or other electronic devices which do not mate with the sides 22 and the rails 23, adapter 50 is first attached to the device by means of z strips 54. Then the adapter 50 and device are slid as a unit into the support portion 20 and secured.

Removal of the radar detector 14 is equally simple, o and requires only withdrawal of the radar detector 14 or adapter 50 from the support portion 20. Alternatively, the entire bracket 10 may be removed by detaching the suction cups 42 from the windshield 12. Tabs 48 are provided on suction cups 42 to facilitate their removal from the windshield 12.

Thus, the present invention provides a simple and inexpensive bracket 10 for mounting a radar detector 14 or similar electronic component to the windshield 12 of a motor vehicle in a position which is readily accessible to the operator. In addition, the bracket 10 reduces the risk of theft by allowing the operator to quickly and easily mount and dismount the component and/or the component along with bracket 10 as desired.

The foregoing detailed description has been provided for a better understanding of the invention only, and no unnecessary limitations should be understood therefrom as some modifications will be apparent to those skill in the art without deviating from the spirit and scope of the appended claims.

I claim:

1. A bracket for supporting a radar detector or like device within a motor vehicle having a windshield, said bracket comprising:
   a substantially planar mounting portion;
   means for detachably securing said mounting portion to the windshield;
   a substantially planar support portion;
   means for removably mounting the radar detector or like device to said support portion;
   hinge means for pivotally connecting said mounting portion to said support portion, forming an angle therebetween, whereby the angle of the support portion with respect to the mounting portion is variable; and
   locking means for selectively arresting said hinge means thereby to lock said support portion and said mounting portion in a predetermined angular relationship whereby said support portion remains substantially horizontal when said mounting portion is secured to the windshield;
   said support portion further including two parallel edges and at least two sides disposed substantially perpendicular to said support portion on said parallel sides, each of said sides having a free edge spaced from and substantially parallel to said support portion;
   said means for removably mounting including said at least two sides, wherein said at least two sides each have an internal face adapted to frictionally engage the radar detector or like device; and
   each of said at least two sides further includes a longitudinal rail disposed on said internal face between said free edge and said two parallel edges, said rails being adapted to mate with and engage corresponding longitudinal grooves on the radar detector or like device.

2. A bracket as defined in claim 1 wherein said mounting portion comprises a T-shaped body having a cross bar and a stem, said means for detachably securing being disposed at opposing ends of the cross bar and at the base of the stem.

3. A bracket as defined in claim 2 wherein said means for detachably securing comprises suction cups.

4. A bracket as defined in claim 1 wherein said means for detachably securing comprises at least one suction cup disposed on said mounting portion.

5. A bracket as defined in claim 4 wherein said at least one suction cup comprises at least three suction cups disposed in a spaced relationship.

6. A bracket as defined in claim 1 wherein said hinge means comprises:
   a cylindrical extension protruding from an edge of said support portion and having an axis parallel to said support portion edge, said extension further having an axial bore therethrough;
   at least one cylindrical flange protruding from an edge of said mounting portion and having an axis parallel to said mounting portion edge, said flange further having an axial bore therein; and
   a hinge pin disposed in said axial bores of both said extension and said flange, such that said mounting and support portions pivot about said hinge pin.

7. A bracket as defined in claim 6 wherein said at least one cylindrical flange comprises two such flanges disposed in axial alignment on either side of said cylindrical extension, the axial bore of a second one of the flanges being internally threaded.

8. A bracket as defined in claim 7 wherein said hinge pin comprises a bolt having a head at one end and an external thread at a free end and wherein said locking means comprises said bolt which is dimensioned so that, upon insertion into the axial throughbores to engage the internal threads of the second flange, further insertion of said bolt arrests said hinge by clamping the extension and flanges into a locked position.

9. The bracket as defined in claim 1 wherein said hinge means pivotally connects an edge of said mounting portion to an edge of said support portion.

10. A bracket for supporting a radar detector or like device within a motor vehicle having a windshield, said bracket comprising:
    a substantially planar mounting portion;
    means for detachably securing said mounting portion to the windshield;
    a substantially planar support portion having two parallel edges and at least two sides disposed substantially perpendicular to said support portion on said parallel edges;
    means for removably mounting the radar detector or like device to said support portion;
    hinged means for pivotably connecting an edge of said mounting portion to an edge of said support portion, whereby the angle of the support portion with respect to the mounting portion, and thus with the windshield, is variable; and
    locking means for selectively arresting said hinge means thereby to lock said support portion and said mounting portion in a particular angular relationship;
    wherein said means for removably mounting comprises an adapter dimensioned to frictionally engage said sides, said adapter including a flat surface having adhesive means for attaching the radar detector or like device to said flat surface.

11. A bracket as defined in claim 10 wherein said adhesive means comprises hook and pile strips disposed on said flat surface adapted to mate with corresponding strips on the radar detector or like device.

12. A bracket as defined in claim 10 wherein each of said side further comprises a longitudinal rail disposed on an internal face of said sides and said adapter further comprises corresponding longitudinal grooves to engage said longitudinal rails.

* * * * *